US011360733B2

(12) United States Patent
Cardenas Gasca et al.

(10) Patent No.: US 11,360,733 B2
(45) Date of Patent: Jun. 14, 2022

(54) COLOCATED SHARED AUGMENTED REALITY WITHOUT SHARED BACKEND

(71) Applicant: Snap Inc., Santa Monica, CA (US)

(72) Inventors: Ana Maria Cardenas Gasca, Pasadena, CA (US); Ella Dagan Peled, Santa Cruz, CA (US); Andrés Monroy-Hernández, Seattle, WA (US); Ava Robinson, Solana Beach, CA (US); Yu Jiang Tham, Los Angeles, CA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/248,981

(22) Filed: Feb. 16, 2021

(65) Prior Publication Data

US 2022/0075591 A1 Mar. 10, 2022

Related U.S. Application Data

(60) Provisional application No. 62/706,788, filed on Sep. 10, 2020.

(51) Int. Cl.
*G06T 19/00* (2011.01)
*A63F 13/847* (2014.01)
(Continued)

(52) U.S. Cl.
CPC .......... *G06F 3/1454* (2013.01); *A63F 13/213* (2014.09); *G06F 3/011* (2013.01);
(Continued)

(58) Field of Classification Search
CPC ...... G06F 3/1454; G06F 3/011; G06F 3/0488; G06F 3/04847; A63F 13/213;
(Continued)

(56) References Cited

U.S. PATENT DOCUMENTS 5,880,731 A    3/1999  Liles et al.
6,023,270 A    2/2000  Brush, II et al.
(Continued)

FOREIGN PATENT DOCUMENTS

CN    109863532 A    6/2019
CN    110168478 A    8/2019
(Continued)

*Primary Examiner* — Jin Cheng Wang
(74) *Attorney, Agent, or Firm* — Schwegman Lundberg & Woessner, P.A.

(57) ABSTRACT

Methods and systems are disclosed for creating a shared augmented reality (AR) session. The methods and systems perform operations comprising: receiving, by a client device, input that selects a shared augmented reality (AR) experience from a plurality of shared AR experiences; in response to receiving the input, determining one or more resources associated with the selected shared AR experience; determining, by the client device, that two or more users are located within a threshold proximity of the client device; and activating the selected shared AR experience in response to determining that the two or more users are located within the threshold proximity of the client device.

20 Claims, 16 Drawing Sheets

(51) Int. Cl.
*H04L 29/06* (2006.01)
*G06F 3/14* (2006.01)
*G06F 3/01* (2006.01)
*G06T 7/20* (2017.01)
*G06F 3/0488* (2022.01)
*G06K 7/14* (2006.01)
*A63F 13/213* (2014.01)
*H04L 67/52* (2022.01)
*G06V 40/10* (2022.01)

(52) U.S. Cl.
CPC ......... *G06F 3/0488* (2013.01); *G06K 7/1439* (2013.01); *G06T 7/20* (2013.01); *G06T 19/006* (2013.01); *G06V 40/10* (2022.01); *H04L 67/18* (2013.01); *A63F 2300/8082* (2013.01); *G06T 2200/24* (2013.01); *G06T 2207/10016* (2013.01); *G06T 2207/30196* (2013.01); *G06T 2219/024* (2013.01)

(58) Field of Classification Search
CPC ........ A63F 13/31; A63F 13/54; A63F 13/847; G06K 9/00352; G06T 19/006; G06T 7/20; H04L 67/38; H04L 67/18
See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | Andres del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,269,180 B2 * | 4/2019 | Yamamoto | A63F 13/285 |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,645,092 B1 * | 5/2020 | Bonar | G06F 16/51 |
| 10,657,701 B2 | 5/2020 | Osman et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0020661 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0094417 A1 * | 4/2008 | Cohen | A63F 13/52 345/632 |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |

(56) References Cited

U.S. PATENT DOCUMENTS

| | | |
|---|---|---|
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1* | 10/2013 | McCulloch ........... G06T 19/006 |
| | | 345/419 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0062162 A1* | 3/2015 | Kim ...................... G06T 19/006 |
| | | 345/633 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0310757 A1* | 10/2019 | Lee ..................... G06F 3/04815 |
| 2019/0356705 A1* | 11/2019 | Escudero ............. H04L 65/1059 |
| 2020/0098187 A1* | 3/2020 | Herscher .............. G02B 27/017 |
| 2020/0167120 A1* | 5/2020 | Rakshit .................. H04L 67/38 |
| 2020/0360823 A1* | 11/2020 | Cahill ................... A63F 13/216 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

* cited by examiner

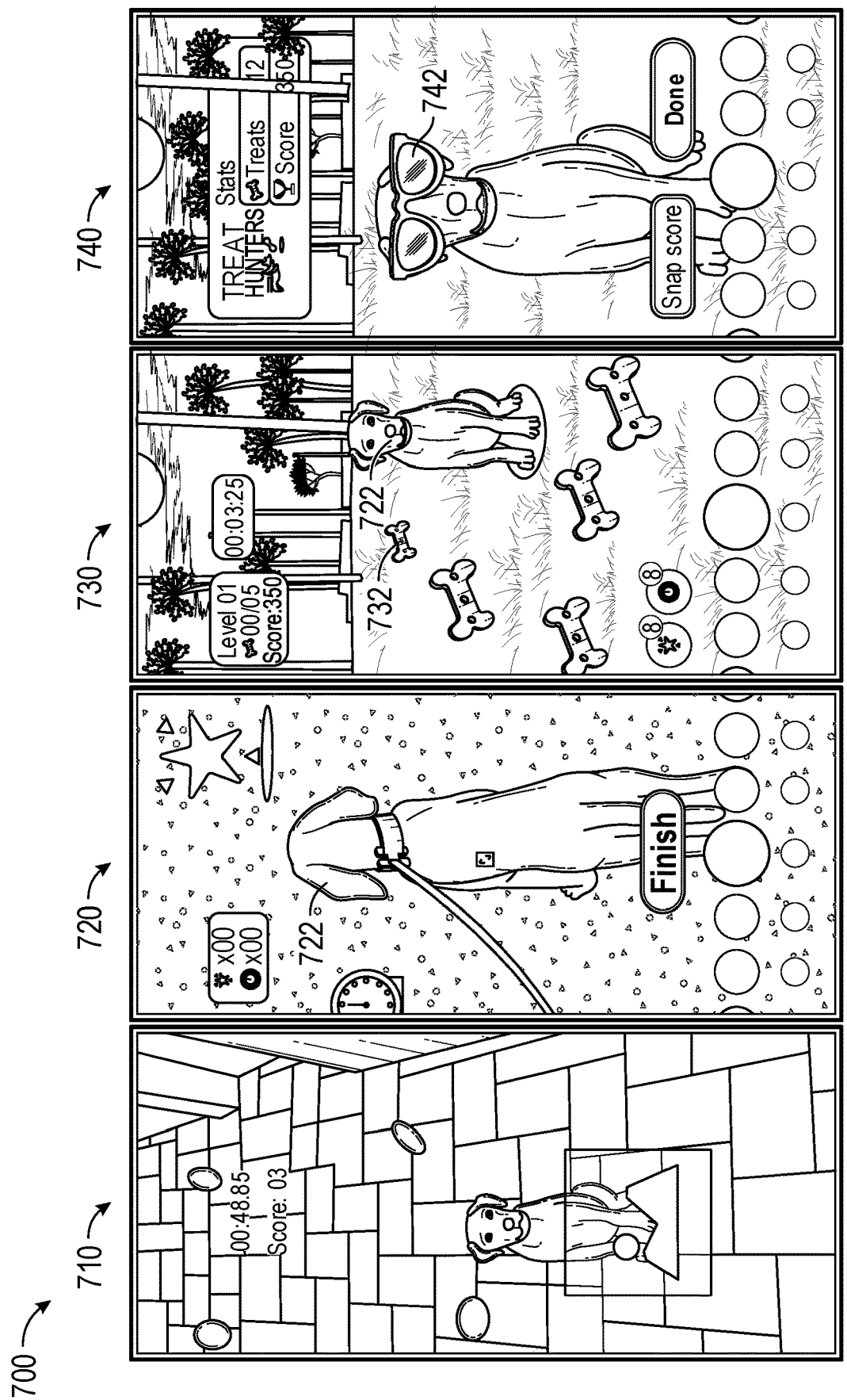

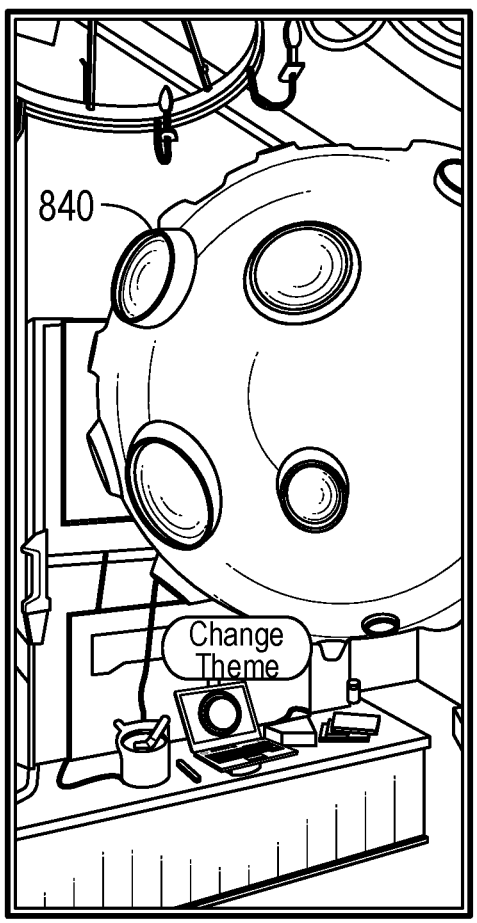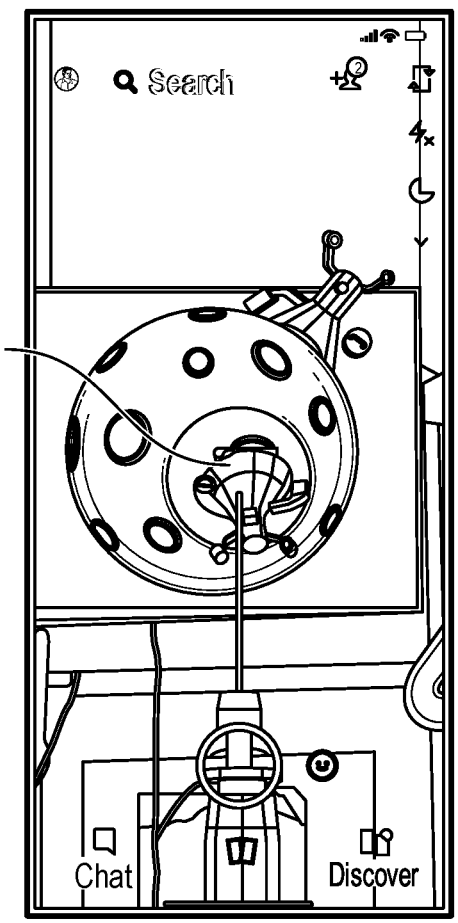
FIG. 8B

900

COLOCATED SHARED AUGMENTED REALITY WITHOUT SHARED BACKEND

CLAIM OF PRIORITY

This application claims the benefit of priority to U.S. Provisional Application Ser. No. 62/706,788, filed Sep. 10, 2020, which is incorporated herein by reference in its entirety.

TECHNICAL FIELD

The present disclosure relates generally to providing augmented reality experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 5A, 5B, 6A, 6B, 7, 8A, 8B, 9A and 9B are diagrammatic representations of shared AR experiences, in accordance with some examples.

DETAILED DESCRIPTION

Figure 1:
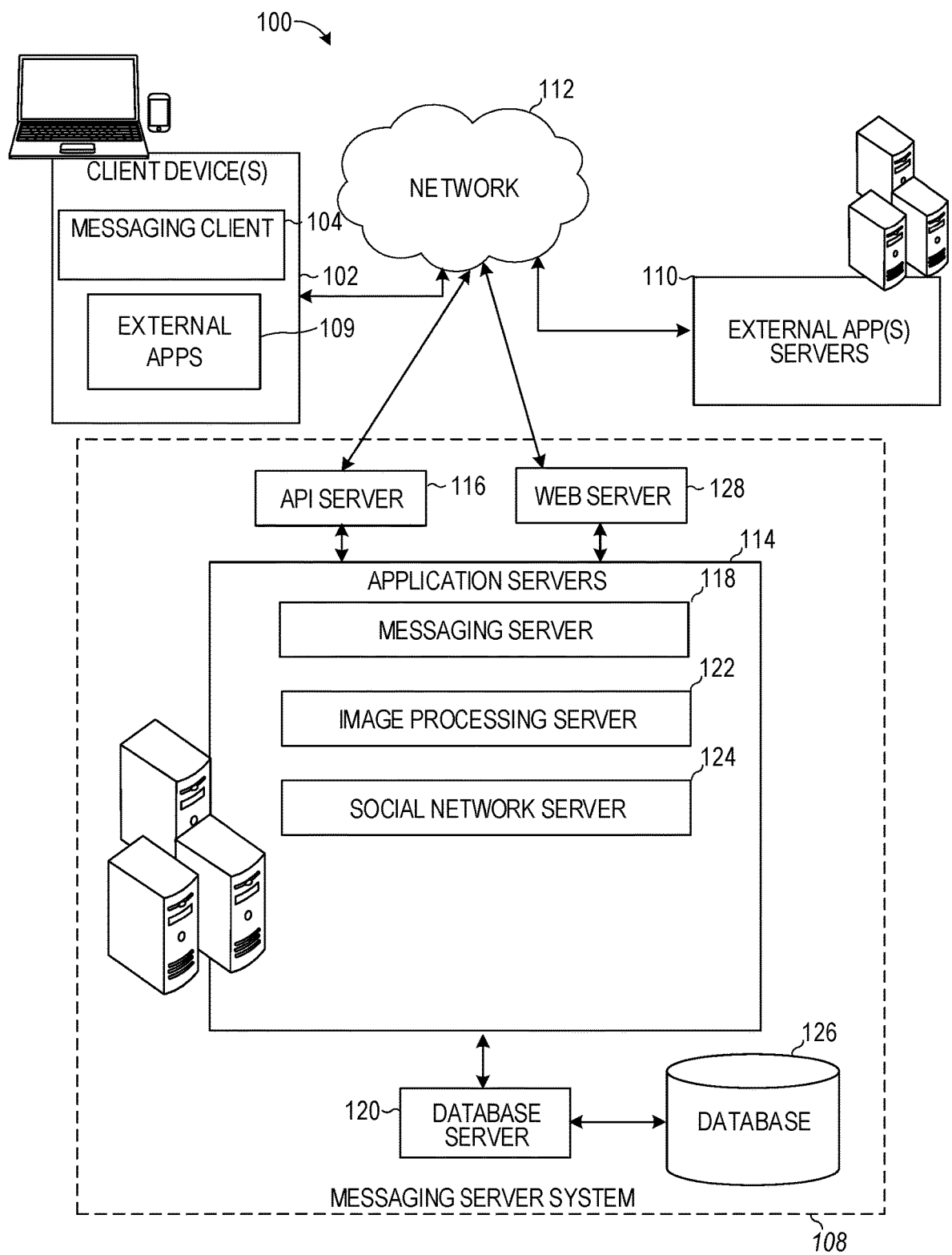
FIG. 1 is a diagrammatic representation of a networked environment in which the present disclosure may be deployed, in accordance with some examples.

The description that follows includes systems, methods, techniques, instruction sequences, and computing machine program products that embody, illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Among other things, examples of the present disclosure improve the functionality of an AR creation software and system by establishing a common coordinate system for a shared AR session that is based on skeletal positions (e.g., of an object, such as a human body) and tracking. In some examples, the system hosts a shared AR session that is a session in which a plurality of users via client devices can participate. Each user in the shared AR session can see the same AR objects positioned in the real-world scene from each user's own perspective. The shared AR session can be, for example, an AR car racing game in which each user is controlling a different car. Each of the users are looking at the same shared AR scene that includes real-world objects being displayed on the client devices at the same time. A common AR object or set of AR objects, such as AR cars, are displayed on each of the client devices in the shared AR scene. This way, the users can view the AR scene from different orientations, positioning and perspectives while still seeing the common AR object or set of AR objects. The experience can be synchronized and shared between all the users. In this example, the actions of one user in the shared AR session can be synchronized and broadcast to all the other users. Accordingly, the shared AR session is a shared virtual space but in AR. As another example, two users can point their devices towards a real-world scene containing a table. The two users can be next to each other or across the table from each other. An AR object, such as a virtual paper can be placed on the real-world table and viewed by each of the users on their respective devices. As one user modifies the virtual paper by writing in virtual ink on the paper, the other user can see the virtual paper being modified at the same time.

The shared AR scene can be synchronized, in some cases, using predefined markers. For example, one device can display a barcode or other suitable predefined image for another device to scan and determine the appropriate transformation for the AR scene. Namely, the orientation of a first device on which the marker is displayed when the marker is scanned by a second device can be used by the second device to determine information about the coordinate system of the first device. An example of such a system is described in further detail in commonly-owned, commonly-assigned U.S. patent application Ser. No. 16/729,078, filed Dec. 27, 2019, which is hereby incorporated by reference in its entirety.

According to the disclosed examples, a plurality of shared AR experiences or mobile applications are provided for supporting and encouraging co-located shared experiences from two or more users, each of the plurality of shared AR experiences are configured to be operated independently of a server. Co-located shared experiences, according to some implementations, requires that the two or more users be within a threshold proximity (e.g., less than 20 feet) of each other or a common shared client device. One way in which the disclosed examples provide such experiences involves connecting the AR experience to shared physical entities, such as sharing one device. This way, data does not need to be communicated with or exchanged with a server in order to provide a seamless and enjoyable shared AR experience between multiple users. The disclosed examples focus on connecting users when they are together to encourage in-person social interaction without exchanging data with a server. By removing communications with a server from the shared AR experiences, users are required to be together within a threshold proximity of each other to enjoy and use the shared AR experiences.

In some cases, the shared AR experiences are disabled if the users are determined to be more than a threshold proximity of each other or a common client device. The shared experiences include sharing a single device among a plurality of users, passing a single device between the plurality of users, and parallel use of the shared experience across a plurality of devices triggered by a shared marker from a third device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

In some examples, the augmented reality items move around or track a real-world object that is depicted. For example, the augmented reality items may be makeup items that are placed on a real-world face that is depicted. As the face moves around, accelerometer and gyroscopic sensors of the client device 102 provide measurements representing motion. This information is used to adjust positioning of the augmented reality items relative to the face so that the augmented reality items track the position of the face in 3D and maintain their placement on the face as the face moves around. In some examples, the launch of the augmented reality experience includes a preview of the augmented reality experience. For example, the augmented reality experience may be a restricted access experience or premium experience that can be purchased by the user (e.g., by exchanging a certain amount of virtual currency or tokens). When such an augmented reality experience is previewed, only a subset of the augmented reality items is presented on top of the real-world object (e.g., the face), such as 2D images of the augmented reality items. The 2D images do not track movement of the face and positioning of the augmented reality items is not updated based on accelerometer and gyroscopic sensors of the client device 102 that provide measurements representing motion. As such, while in one set of frames the augmented reality items are presented on the cheek of the face depicted in the images, when the user moves around, the augmented reality items maintain the static position and are no longer presented on the cheek (e.g., they may be presented on another real-world surface or another portion of the face) in a subsequent frame. Namely, the augmented reality items are statically positioned and overlay whatever real-world object appears in view at their static position in the video. In some cases, once the access restriction is removed from the given augmented reality experience, the preview of the experience is converted to activation of the augmented reality experience in which the augmented reality items track movement of a real-world object depicted in the video.

Figure 3:
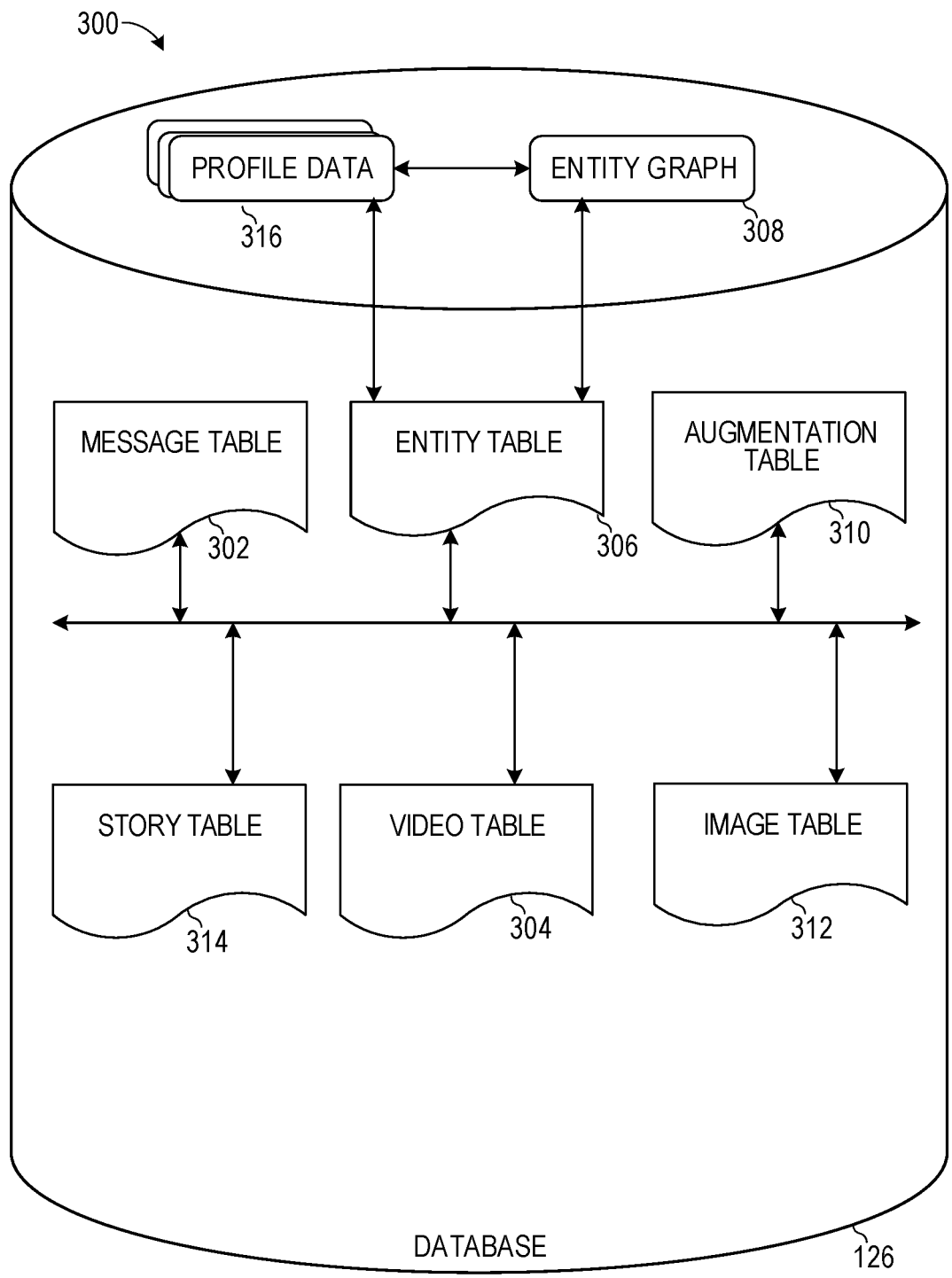
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a son file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
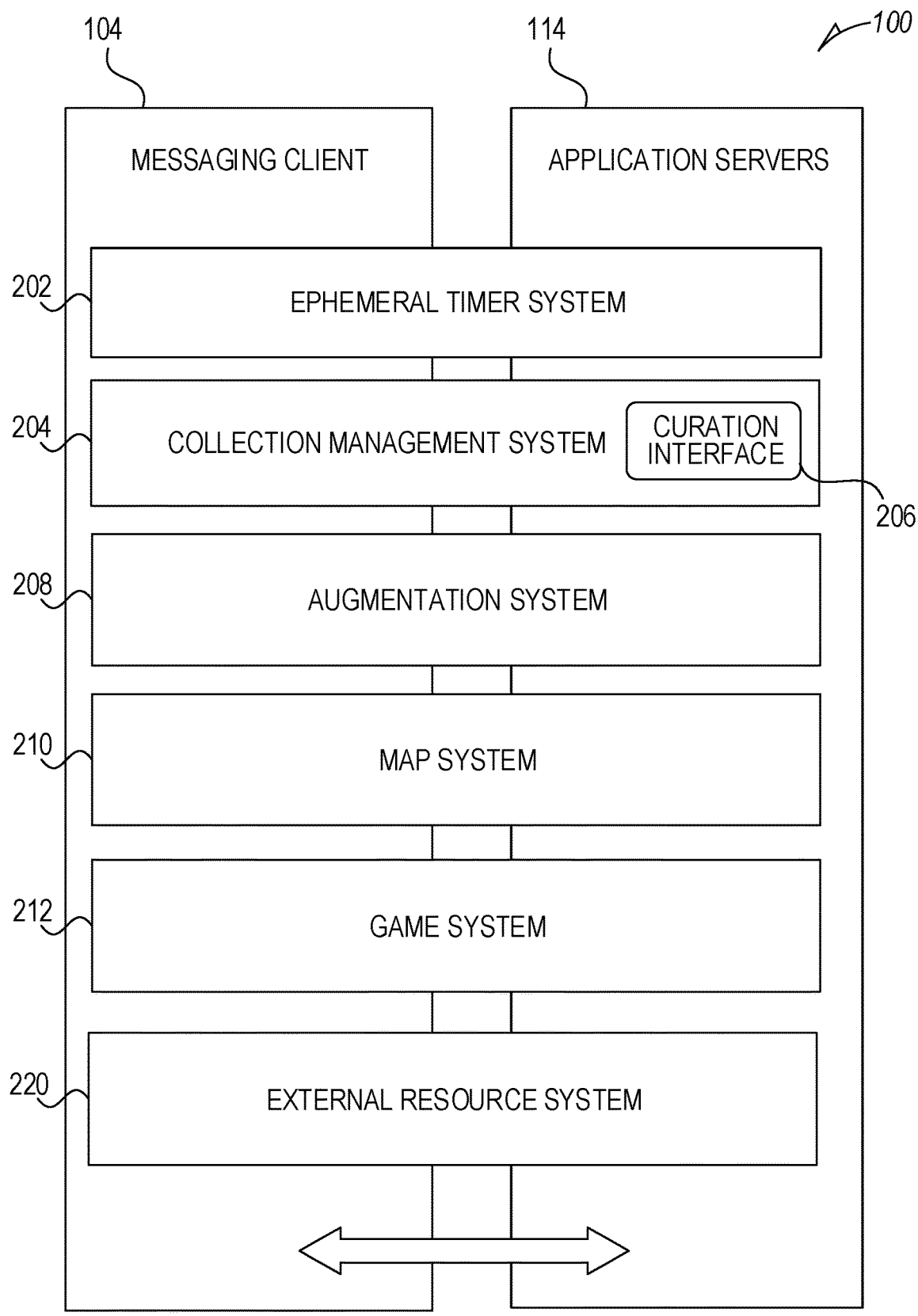
FIG. 2 is a diagrammatic representation of a messaging client application, in accordance with some examples.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100, The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may, include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 106. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content in according to a common coordinate system or frame as the first client device 102.

The augmentation system 208 that can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video dip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
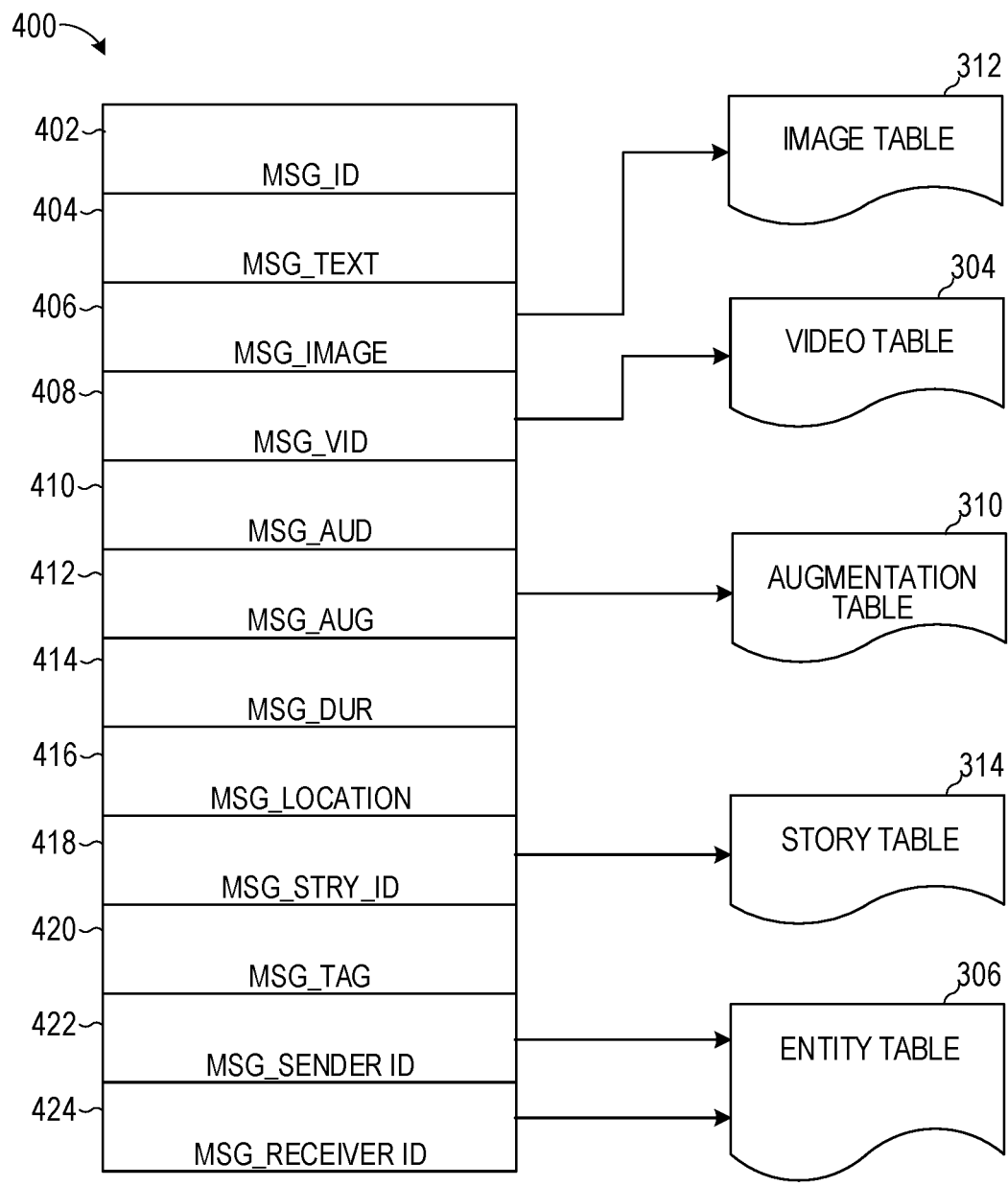
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

The disclosed examples discuss various types of shared experiences. One type of shared AR experience for co-located users includes a directing shared. AR experience. Such an experience involves an egg hunt, scavenger hunt, hot/cold item, land/sea game, and Simon says. Another type of shared AR experience for co-located users includes a sharing with pets AR experience. Such an experience involves walking, playing, petting or training a pet, such as a dog. Another type of shared AR experience for co-located users includes a collective storytelling experience. Such an experience involves reading books and comics and making up stories. Another type of shared AR experience for co-located users includes a chasing AR experience. Such an experience involves laser tag, tag, you are it game, sharks and minnows, and the like, Another type of shared AR experience for co-located users includes a synchronizing AR experience. Such an experience involves couples' challenges, guitar hero, and dancing. Another type of shared AR experience for co-located users includes a passing an object AR experience. Another type of shared AR experience for co-located users includes a creating together AR experience, such as cooking together. Another type of shared AR experience for co-located users can include a performing together AR experience, such as taking a group picture, Another type of shared AR experience for co-located users can include a gathering around AR experience, such as playing a board game, Another type of shared AR experience for co-located users can include a gifting AR experience, such as a birthday present and placing notes on a fridge.

In some examples, augmented graphical elements that modify a real-time video feed are used to create the shared AR experiences. Such augmented graphical elements use publicly available features and may not rely on a shared backend server.

In some examples, a first shared AR experience is selected from a plurality of shared AR experiences. The shared AR experience that is selected includes a passing an object experience. In this case, the shared AR experience allows a group of two or more users to pass an object, such as a client device 102, between each of the users. Each user takes a turn holding the client device 102 so that the client device 102 is accessed by the users one-at-a-time.

Figure 5A:
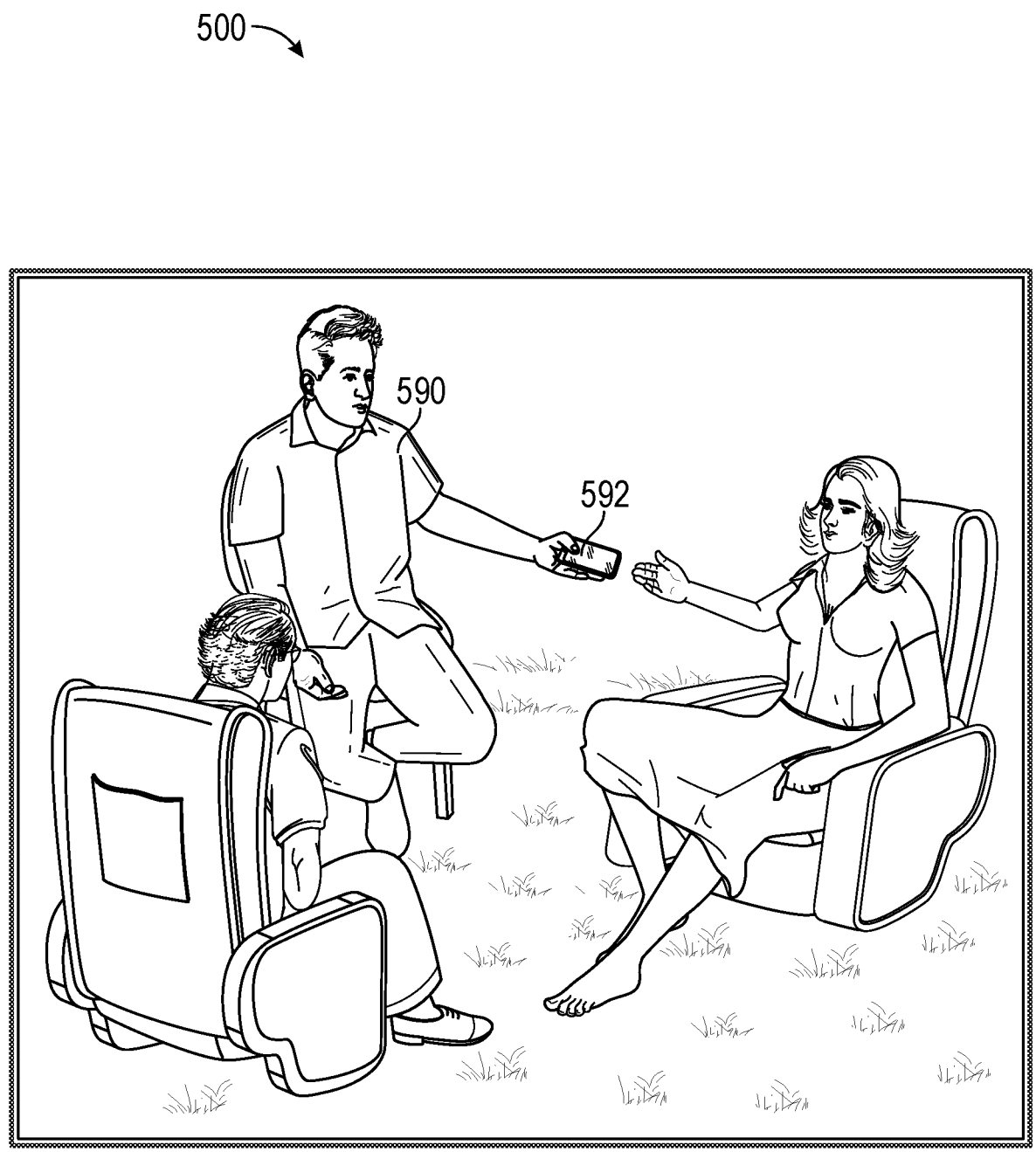
Figure 5B:
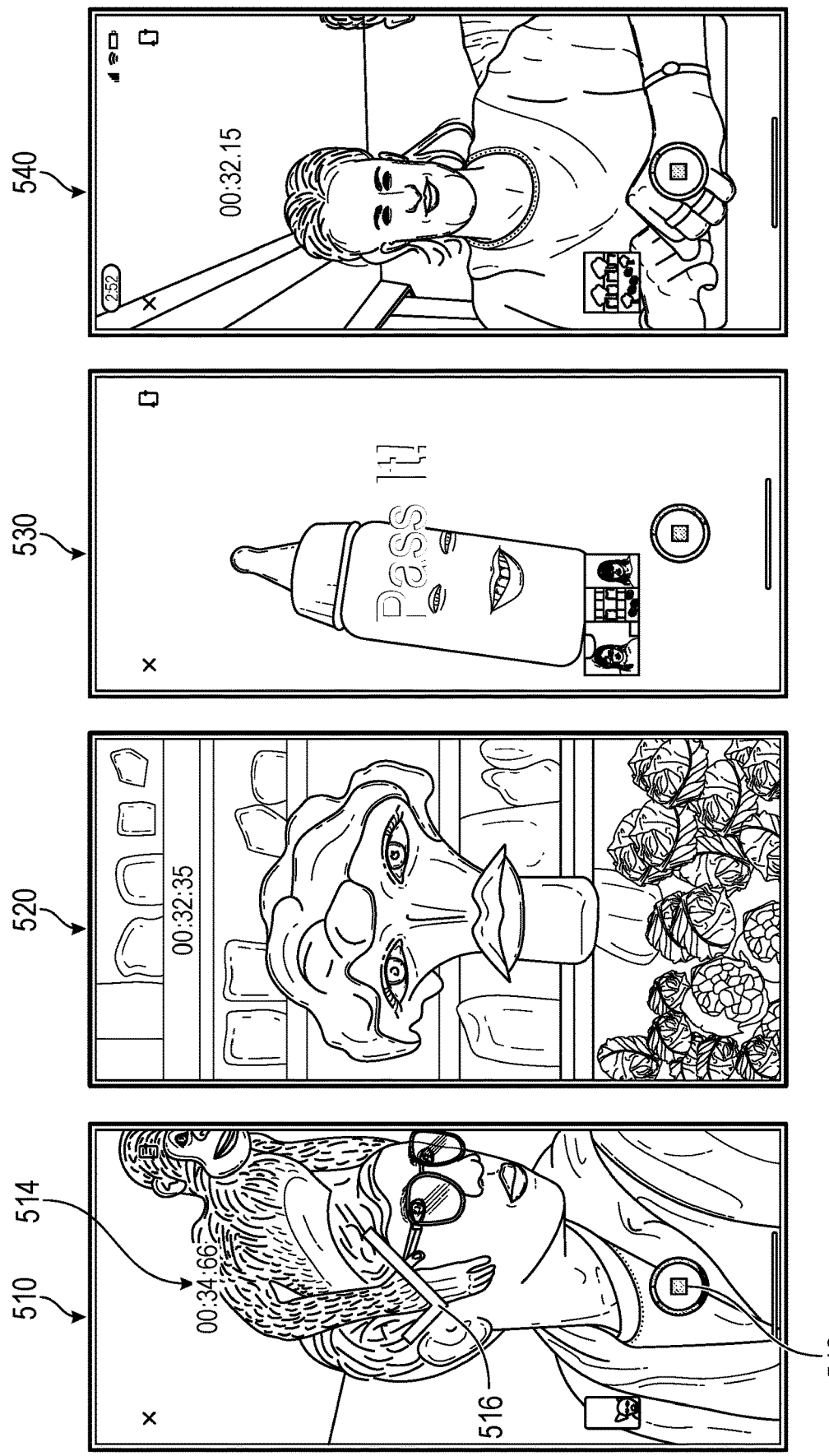

FIGS. 5A and 5B show an example of a first shared device AR experience 500, according to some examples, in which users take turns holding a client device to share an AR experience. Specifically, as shown in FIG. 5A, multiple users 590 are within a specified proximity of each other (e.g., within the same room or within less than 15 feet of each other). The users 590 are sharing a single client device 592. Namely, as shown in FIG. 5A, the single client device 592 is being passed around physically from one user to another user to share the AR experience.

For example, as shown in FIG. 5B, a first user holds the client device 102 while a front-facing camera of the client device 102 is activated. When the face of the first user 594 is recognized or when the first user 594 performs a suitable action, such as a gesture; the client device 102 presents a first user interface 510. The first user interface 510 instructs the first user 594 to complete a task, such as to make a face or a gesture while a group timer 514 is presented on the first user interface 510. The first user interface 510 includes a task timer 512 (individual timer). The task timer 512 is of a shorter duration than the group timer 514. Namely, the group timer 514 is of a long enough duration (e.g., 3 minutes) to allow multiple users 590 to perform multiple tasks. The task timer 512 is of a long enough duration (e.g., 20 seconds) to allow a single user to perform a particular task.

After the client device 102 detects that the first user 594 correctly, completed the task by processing a video feed of the front-facing camera, a checkmark 516 is presented and a second graphical user interface 520 is presented. The group timer 514 continues counting down from when the first user 594 correctly competed the task and instructs the first user 594 to pass the client device 102 to a second user 596 in a third user interface 530. In another example, the group timer 514 is paused when the first user completes the task correctly. After the group timer 514 is paused, the third user interface 530 is presented prompting the first user to pass the client device 102 to the second user 596.

Upon detecting the face of the second user 596 in the video feed of the front-facing camera or when input is received from the second user 596 to continue the shared AR experience, the client device 102 presents a fourth user interface 540 to the second user 596 and instructs the second user 596 to perform another task. The group timer 514 may be un-paused or may continue counting while the second user 596 performs the another task. The fourth user interface 540 shows the second user 596 the current group timer 514 and a task timer indicating how much time is left for all of the users 590 to complete the tasks they are respectively presented with and how much time the second user 596 has left to complete the specified task. After the second user 596 completes the specified task, the second user 596 is instructed to pass the client device 102 back to the first user 594 or to a third user who is co-located (e.g., within the same room or a specified distance, such as less than 15 feet) with the first and second users 594 and 596.

When the group timer 514 finishes counting down (expires), the user who is currently holding the client device 102 and who has not yet competed the specified task is indicated to be the user who lost the game. A camera (e.g., a front-facing camera) automatically captures an image of the losing user when the group timer 514 reaches the threshold value (e.g., when the group timer finishes counting down or expires). The client device 102 then automatically sends the captured image to all of the users who were involved in the shared device AR experience. In some cases, the difficulty of the task that needs to be performed increases as the timer counts down and as different users continue performing the task with the shared client device 102.

In some cases, when the task timer 512 finishes counting down (expires) before the group timer 514 finishes counting down, the user who is currently holding the client device 102 and who has not yet competed the specified task is indicated to be the user who lost the game. A camera (e.g., a front-facing camera) automatically captures an image of the losing user when the task timer 512 reaches the threshold value (e.g., when the individual timer finishes counting down). The client device 102 then automatically sends the captured image to all of the users who were involved in the shared device AR experience.

In some cases, the user who loses the game (e.g., because that user was the last user holding the client device 102 when the group timer 514 finished counting (expires) or the user did not complete the task before the task timer 512 finished counting) is removed from the game. The remaining users continue playing until one user remains in the game, where each of the remaining users lose the game one-at-a-time when the group timer 514 finishes counting (expires) while the respective users hold the client device 102 or the task timer runs out of time while the respective users perform the task. The last user who remains in the game wins the game.

In some examples, a second shared. AR experience is selected from a plurality of shared AR experiences. The second shared AR experience that is selected includes a collective storytelling experience. In this case, the shared AR experience allows a group of two or more users to create a story together, such as using a shared client device 102 that captures images of the users' feet. Namely, the shared client device 102 can be held by one person but viewed by two or more people at the same time.

Figure 6A:
Figure 6B:
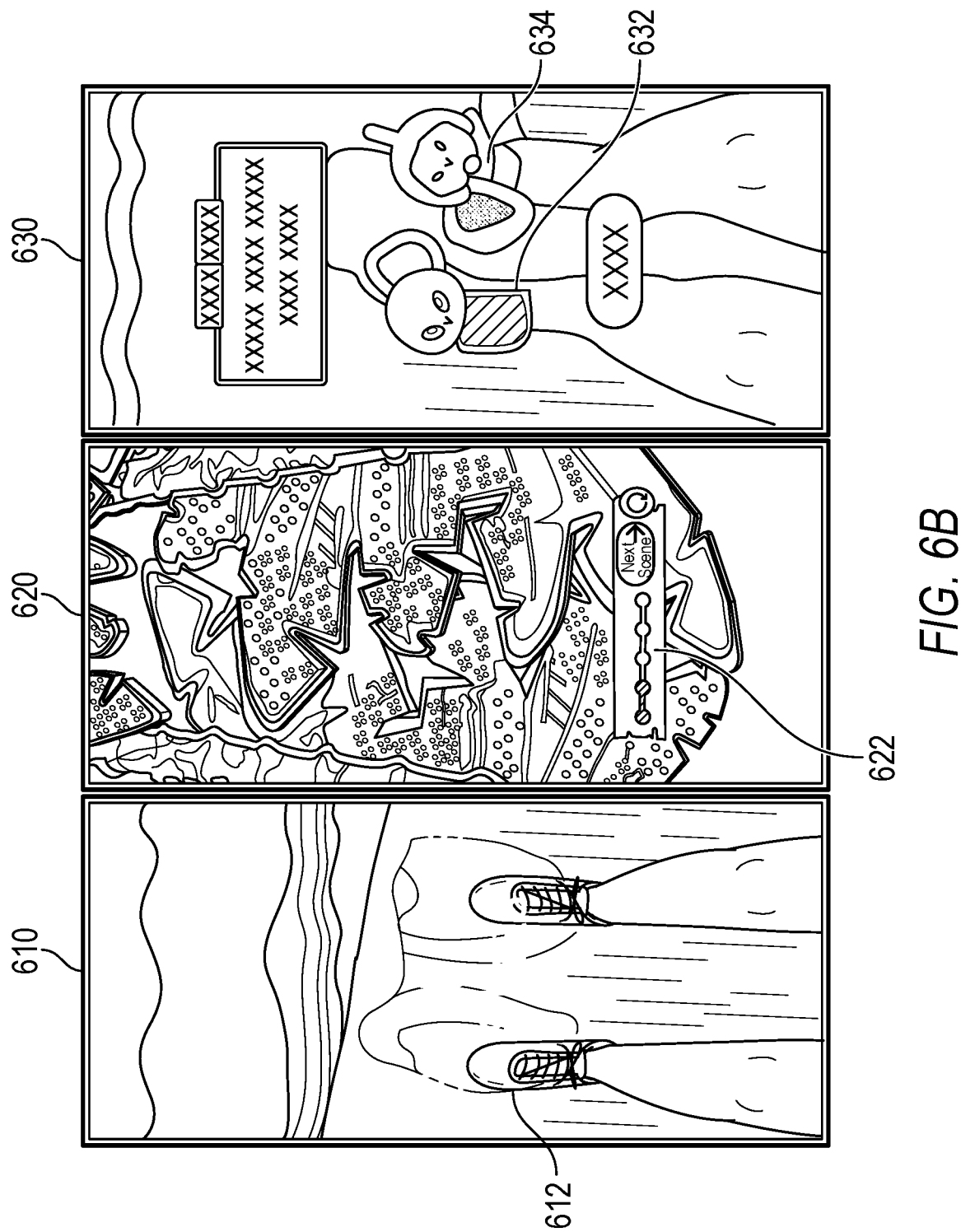

FIGS. 6A and 6B shows an example of a second shared device AR experience 600. For example, as shown in FIG. 6A, a set of users (e.g., two or more users) can be in the same room. The set of users 690 are each looking at the same single client device 692 (e.g., client device 102). Namely, one user of the set of users 690 can be holding the client device 102 while that user and other users in the set of users 690 are looking at the client device 692.

As shown in FIG. 6B, an augmented reality element (also referred to as augmented reality content item) option, such as a feet filter can be selected and activated on the client device 102. In response, the client device 102 activates a feet filter by turning on a rear-facing camera of the client device 102. While the feet filter is activated, a screen 610 is presented on the client device 102. When one of the two or more users' feet are detected in a video stream captured by rear-facing camera of the client device 102, the client device 102 presents a screen 620. The user can move their feet to change or move around one or more augmented reality elements (or content items) shown on the screen 630. When the user is satisfied with the positioning of the augmented reality elements, the user hands the client device 102 to a second user and presses a next scene icon 622. The second user is presented with a second set of augmented reality elements and when the second user's feet are detected in the rear-facing camera of the client device 102, the second set of augmented reality elements is modified based on the second user's feet. When all of the co-located users complete creating the story together using their respective feet, a complete option can be selected to store the story on the client device 102. The story can automatically be shared and sent to respective client devices 102 of the users who created the story together.

In some examples, the feet filter is activated and presented in response to detecting presence of feet 612 in a camera feed received from a rear-facing camera of the client device 102. In response, a prompt is displayed asking the user to confirm activation of the feet filter and the storytelling AR experience. In one example, the client device 102 can present a first augmented reality puppet 632 on a first foot of the feet in the video feed. The client device 102 can present a second augmented reality puppet 634 on a second foot of the feet in the video feed. In some examples, the first foot can be a right foot of a first user and can appear in a left portion of the video feed. The second foot can be a left foot of a second user and can appear in a right portion of the video feed. Additional feet of other users can also be detected in the video feed and replaced or overlaid with corresponding augmented reality puppets.

The client device 102 presents a task (to complete an interaction) for the various users to complete who are sharing the client device 102, such as by moving their respective feet. The client device 102 monitors concurrently actions of the two or more users in response to the presented interaction. Each of the first and second users can individually control and move the respective first and second augmented reality puppets 632 and 634 by moving their respective feet to complete the task. Namely, the client device 102 detects individual movement of the feet of the users and individually moves the respective first and second augmented reality puppets 632 and 634 associated with the particular foot for which movement was detected. For example, when the client device 102 detects that the first foot was moved left while the second foot remains stationary, the client device 102 moves the first augmented reality puppet 632 left by the same degree and amount while keeping the second augmented reality puppet 634 stationary. The client device 102 can present instructions with a specified task to complete. The task can be completed by moving the feet. After the specified task is completed, the next scene icon 622 is selected which specifies another task to perform with the feet. In some cases, the task includes tapping the feet together. In response to the client device 102 detecting contact between two feet (e.g., a right foot making contact with a left foot) in the video feed, an augmented reality effect, such as a plurality or set of augmented reality elements are displayed and the task is completed.

In some examples, the augmented reality puppets 632 and 634 represent augmented reality fish swimming in a body of water. In response to the client device 102 detecting that a given gesture pressing the foot down or forward and away from the rear-facing camera) has been performed by a particular foot, the client device 102 moves the augmented reality puppet 632 corresponding to the particular foot down. Namely, the augmented reality puppet 632 dives or descends when the given gesture is performed and ascends when an opposite gesture is detected (e.g., the foot is detected as being pulled back towards the rear-facing camera). In some cases, the augmented reality puppet can be controlled by the foot to swim through other augmented reality elements (e.g., seaweed) to spread the augmented reality elements apart to reveal a treasure or target. In some cases, the augmented reality puppets 632 and 634 can interact with each other in response to detecting that the two feet have been tapped or touched each other.

In some examples, a third shared AR experience is selected from a plurality of shared AR experiences. The third shared AR experience that is selected includes a sharing with pets experience. In this case, the shared AR experience allows a user to use the client device 102 to view one or more augmented reality elements while walking their pet. An image or video of the pet is captured by a rear-facing camera of the client device 102.

FIG. 7 shows an example of a third shared device AR experience 700. For example, a first user interface 710 is presented in response to the rear-facing camera of the client device 102 detecting a pet, such as a dog, within a video stream captured by the rear-facing camera of the client device 102. The first user interface 710 includes a timer indicating how much longer the user has left to complete the task of walking the pet as well as a current score. As the user walks the pet 722, a second user interface 720 is presented that includes one or more augmented reality graphical elements 724. The one or more augmented reality graphical elements 724 are presented to the user within a camera feed of the client device 102 that is capturing images of the pet 722 being walked. The user positions the pet 722 to walk over the augmented reality graphical elements 724 and as the pet's image overlaps a given one of the augmented reality graphical elements, the score is increased.

In some cases, a third user interface 730 is presented in which the user calls the pet 722 and when the pet approaches the user, the goal is for the pet to overlap positions of various augmented reality graphical elements 732 (e.g., pet treats) that are presented. The pet 722 has to overlap the graphical elements 732 within a certain period of time (e.g., a timer, or before a timer reaches a threshold). If, while walking to the user, the pet 722 overlaps a certain threshold number of augmented reality elements 732, a new augmented reality element 742 is selected and positioned as a reward over the pet 722, such as sunglasses shown in the fourth user interface 740. The user can instruct the client device 102 to share an image of the user's pet with the score with one or more other users on a social network.

In some examples, upon the client device 102 detecting a pet within a video stream of the rear-facing camera, the client device 102 automatically displays an augmented reality element, such as a treasure chest on the screen. The position of the pet is tracked on the screen and when the client device 102 detects that the pet position has overlapped the position of the augmented reality element, the augmented reality element is animated to generate a plurality of additional augmented reality elements (e.g., coins are animated as coming out of the treasure chest). The position of the pet continues to be detected and a score is incremented each time the position of the pet overlaps one of the additional augmented reality elements (e.g., the coins).

In some examples, a fourth shared. AR experience is selected from a plurality of shared AR experiences. The fourth shared AR experience that is selected includes a gathering around experience. In this case, the shared. AR experience allows two client devices 102 to be synchronized by a marker and used to accomplish a common task.

Figure 8A:
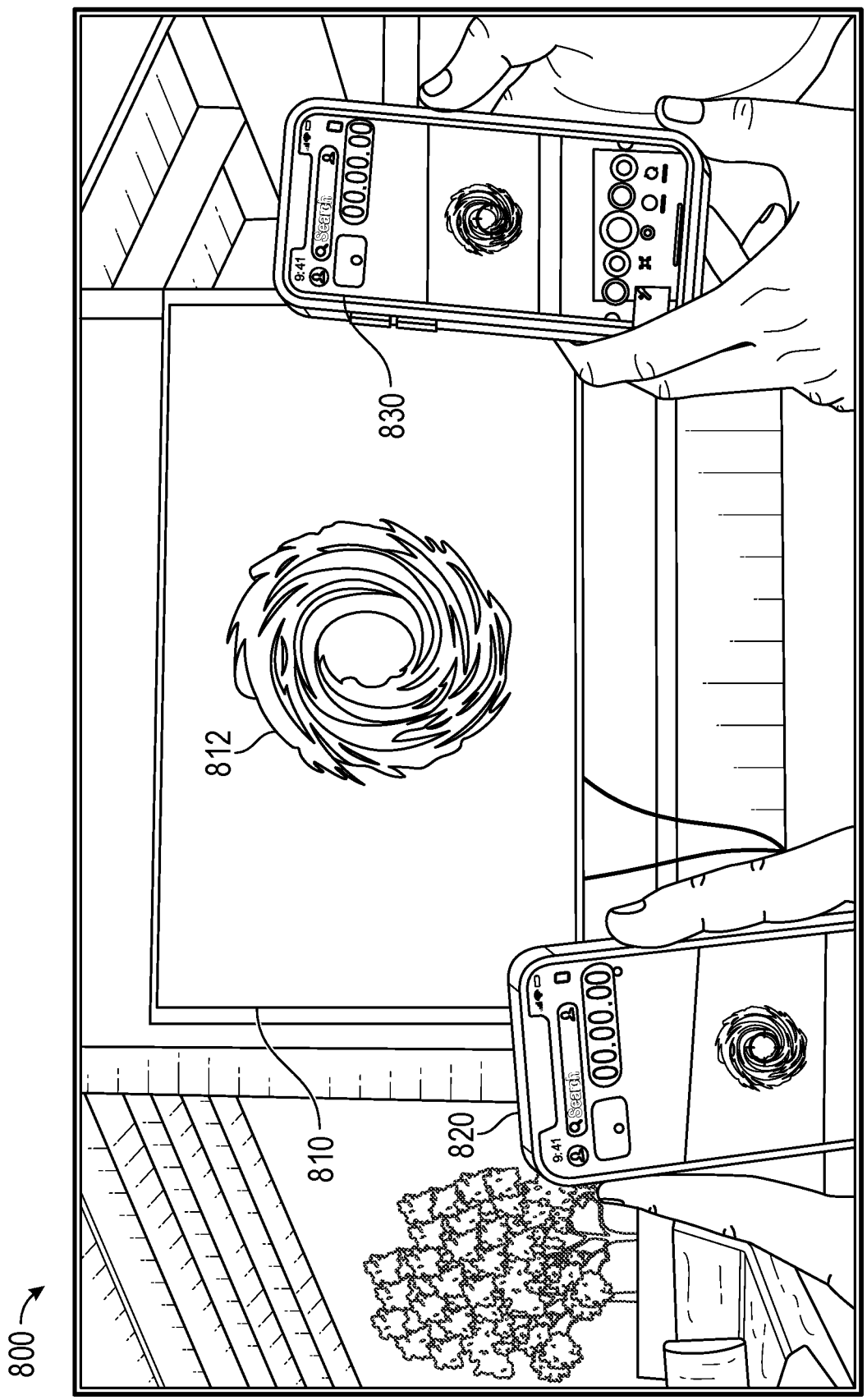

FIG. 8A shows an example of a fourth shared device AR experience 802. Initially, a rotating or animated circle or marker 812 is presented on a first client device 810 (e.g., a television). A second client device 820 (e.g., a first mobile device) and a third client device 830 (e.g., a second mobile device) are each aligned to capture an image of the maker 812 that is presented on the first client device 810 using their respective rear-facing cameras. Each of the second and third client devices 102 needs to be aligned with the picture of the circle or marker 812 that appears on the television (e.g., the first client device 102). Once each of the second and third client devices 102 positions the circle or marker in the specified position on their respective displays, the devices are synchronized and work together to accomplish a common task (e.g., the task shown in FIG. 8B). In response to the two devices being synchronized with the marker 812, a common AR experience is triggered on the second and third client device 102. The marker 812 turns into an animated timer by shrinking in size over time or gradually (slowly). When the marker 812 reaches a certain size or disappears from view, the level or task is complete.

For example, as shown in FIG. 8B, after synchronizing the two client devices 102, the users are presented with a common augmented reality element 840 on their respective devices over respective camera feeds of the devices. The users can move around their devices 102 to shoot or capture a common augmented reality target 850 that appears in the camera feeds of the respective devices 102. For example, the second client device 102 can detect that an augmented reality weapon displayed by the second client device 102 fires an augmented reality bullet. The second client device 102 determines that the augmented reality bullet hits the common augmented reality target 850 and in response the second client device 102 updates a common score associated with the second and third client devices 102. In some cases, a common score is kept for the current level. In some cases, each individual client devices 102 keeps an individual score of the number of augmented reality targets 850 that were captured or hit by the AR weapon of that device 102. At the end of the AR session or game, such as when a timer runs out or expires, the two devices 102 can share (manually or automatically using NFC) their respective individual scores to determine and select a winner between the users of the client devices 102. Similarly, the third client device 102 can detect that an augmented reality weapon displayed by the third client device 102 fires an augmented reality, bullet. The third client device 102 determines that the augmented reality bullet hits the common augmented reality target 850 and in response the third client device 102 updates a common score associated with the second and third client devices 102. The second client device 102 and the third client device 102 displays augmented reality bullets fired by the augmented reality weapon displayed by the third client device 102. In the same way, the third client device 102 and the second client device 102 displays augmented reality bullets fired by the augmented reality weapon displayed by the second client device 102. This way, the first and second users can see the augmented reality bullets they each use their respective client device 102 to fire and control.

After the two or more people synchronize their respective devices using the common marker 812, the two or more users can access the same shared AR experience 802. At the end of the shared AR experience 802, the two or more users can get close to each other so that they can each see each other's devices to compare their scores to determine who is the winner. In other cases, the respective devices of the two or more users exchange communications over a short range communications network, such as near field communications (NFC), and automatically determine and identify which device has the highest score to identify the winner of the shared AR experience 802.

In some cases, the augmented reality target 850 includes an animal, such as a cow that is on a planet represented by the marker 812. In such cases, each of the respective devices displays an augmented reality UFO that can be used to rescue or capture the augmented reality target 850 (e.g., the animal or cow).

A new marker 812 is presented on the first client device 102 after the timer for the current level runs out. The new marker 812 may be the same or similar to the initially presented marker 812 but may be of a different size or color (e.g., to represent a different planet). An image of the new marker 512 is similarly captured by the two client devices 102 to synchronize their AR experience and a new task is presented for the users to complete together. The new marker 512 similarly is animated as shrinking in size to indicate how much time remains to complete the current task. When the new marker 512 is captured by the two client devices 102, a new set of augmented reality targets 850 are presented (e.g., a different animal or breed of animals) that need to be captured by augmented reality UFOs or weapons displayed by the respective client devices 102.

Figure 9A:
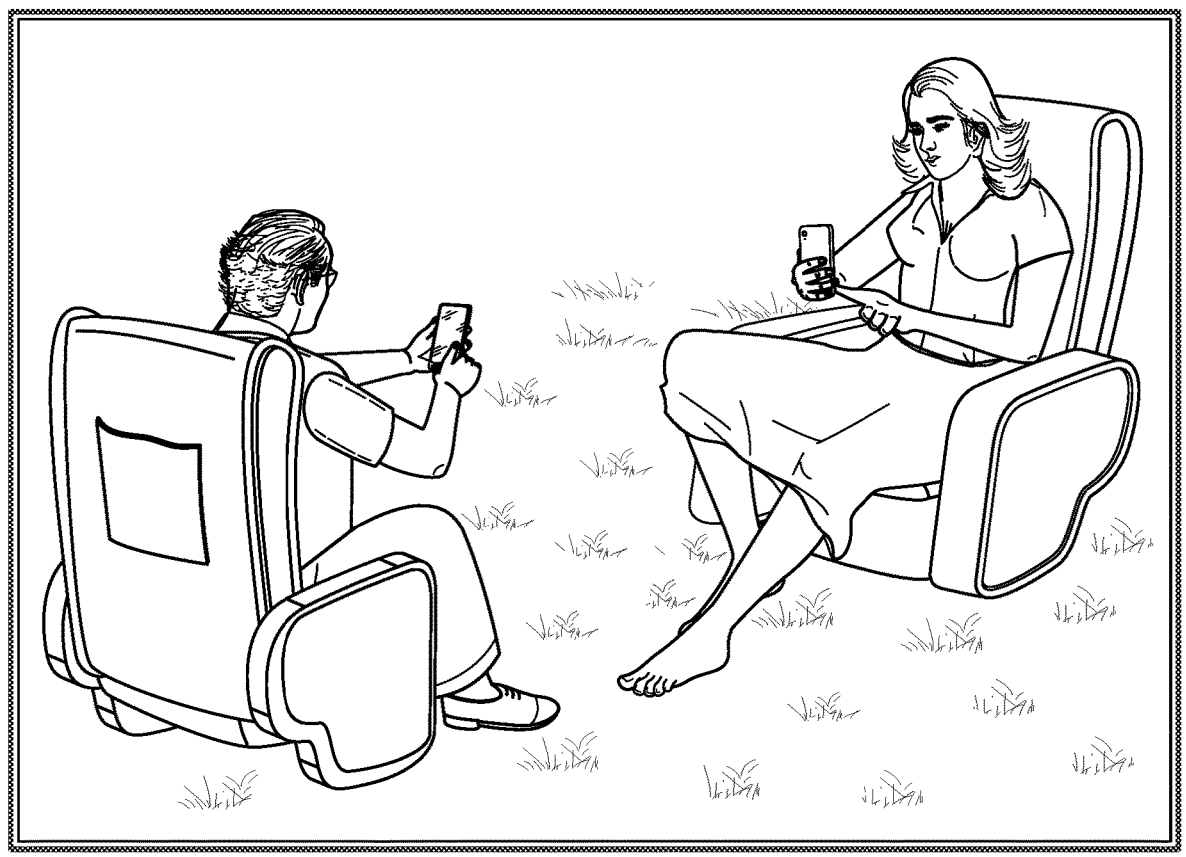
Figure 9B:
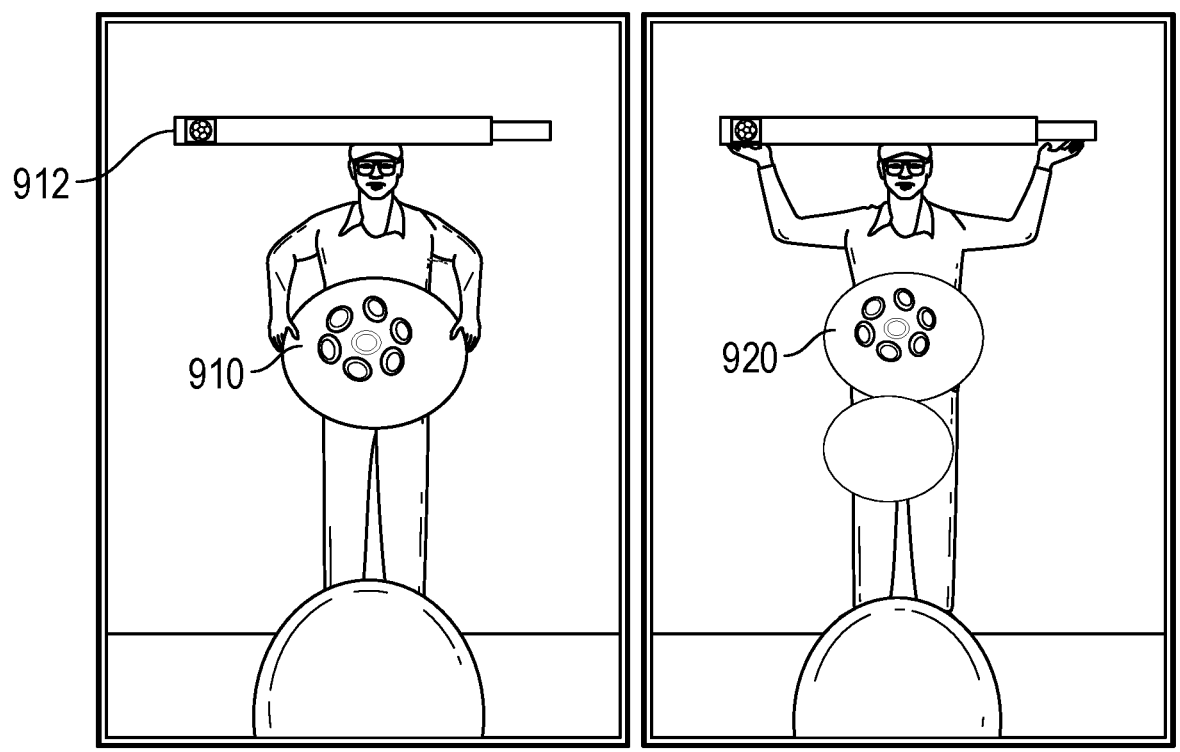

In some examples, a fifth shared AR experience is selected from a plurality of shared AR experiences. The fifth shared AR experience that is selected includes a whole body augmented reality experience. FIGS. 9A and 9B show an example of the fifth shared device AR experience 900, according to some examples. For example, as shown in FIG. 9A, a set of users (e.g., two or more users) are each holding respective client devices 102 and are within a specified proximity of each other (e.g., are in the same room or within less than 25 feet of each other). The users are positioned far enough from each other that their respective cameras of their respective client devices 102 can capture images of each other. The set of users point their client devices 102 at each other and activate the same shared AR experience 900 in which the respective rear-facing cameras capture images of the users on the opposing side.

As shown in FIG. 9B, for example, a first user can use a first client device 102 to capture an image or video feed of a second user. When the first client device 102 detects that a whole body 910 of the second user appears in the video feed, the first client device 102 activates the whole body augmented reality experience. The first client device 102 receives input from the first user, such as by detecting that the first user taps on a display that presents the whole body 910 of the second user. In response to receiving the input, the client device 102 launches an augmented reality element 920 (e.g., an augmented reality snowball) towards the direction of the second user. The launched augmented reality element lands on the second user and remains overlaid at a position where the augmented reality element hits the second user's body. A timer 912 is presented showing the first user how much time remains for input to be received from the first user to launch augmented reality elements 920 at the second user. The goal is to completely cover the second user with augmented reality elements 920. When the whole body 910 is covered by the augmented reality elements 920 that are launched respectively each time input from the first user is received, the game ends. Upon determining that the whole body 910 has been covered by the augmented reality elements 920, the user's body is turned into an augmented reality item (e.g., an augmented reality snowman).

In some cases, while the first user is using the first client device 102 to launch augmented reality elements 920 at the second user, the second user can use a second client device 102 to capture an image or video feed of the first user. When the second client device 102 detects that a whole body 910 of the first user appears in the video feed, the second client device 102 activates the whole body augmented reality experience. The second client device 102 receives input from the second user, such as by detecting that the second user taps on a display that presents the whole body 910 of the first user. In response to receiving the input, the client device 102 launches an augmented reality element 920 (e.g., an augmented reality snowball) towards the direction of the first user. The launched augmented reality element lands on the first user and remains overlaid at a position where the augmented reality element hits the first user's body. A timer 912 is presented showing the second user how much time remains for input to be received from the second user to launch augmented reality elements 920 at the first user. In some cases, the timer 912 is the same and is synchronized between the first and second client device 102 in order to allow the first and second users to launch the augmented reality elements at each other in the same period of time.

The goal is for the two users to completely each other with augmented reality elements 920. Whichever one of the first and second users is successful in covering the whole body of the other user, is declared the winner of the game. Specifically, upon the first client device 102 detecting that the first user has completed covering the body of the second user with the augmented reality elements 920, the first client device 102 sends a message to the second client device 102 indicating that the first user has completed the game. Upon receiving the message from the first client device 102, the second client device 102 determines that the first user has not been completely covered by the augmented reality elements in the display of the second client device 102. In such circumstances, the first and second client devices 102 determine and declare the first user as the winner of the game.

In some examples, at the end of the timer 912, each of the first and second client device 102 compute how much percentage wise of the body of the users have been covered by the augmented reality elements 920. Specifically, the first client device 102 computes what percentage of the body of the second user has been covered by the augmented reality elements 920 to determine a score for the first user of the first client device 102. The second client device 102 computes what percentage of the body of the first user has been covered by the augmented reality elements 920 to determine a score for the second user of the second client device 102. In one example, the client devices 102 communicate these percentages to each other, such as over NFC or other short-range communications network. In response to determining that a greater percentage of the body of the second user has been covered by the augmented reality elements than the percentage of the first user, the client device 102 declare the first user as the winner. As an example, the first client device 102 receives a message from the second client device 102 indicating a percentage of the body of the first user that has been covered by the augmented reality elements. The first client device 102 computes the percentage of the body of the second user that has been covered by the augmented reality elements and, compares the percentage of the first user that has been covered by the augmented reality elements received in the message from the second client device 102 with the percentage computed by the first client device 102. In response to determining that the computed percentage exceeds the percentage received in the message, the first client device 102 indicates that the first user has won the game.

In some examples, at the end of the shared AR experience 900 (e.g., at the end of the timer 912), the two or more users of the first and second client devices 102 can get close to each other so that they can each see each other's first and second client devices 102 to compare their scores to determine who is the winner. In other cases, the respective first and second client devices 102 of the two or more users exchange communications over a short range communications network, such as near field communications (NEC), and automatically determine and identify which device has the highest score to identify the winner of the shared AR experience 900.

Figure 10:
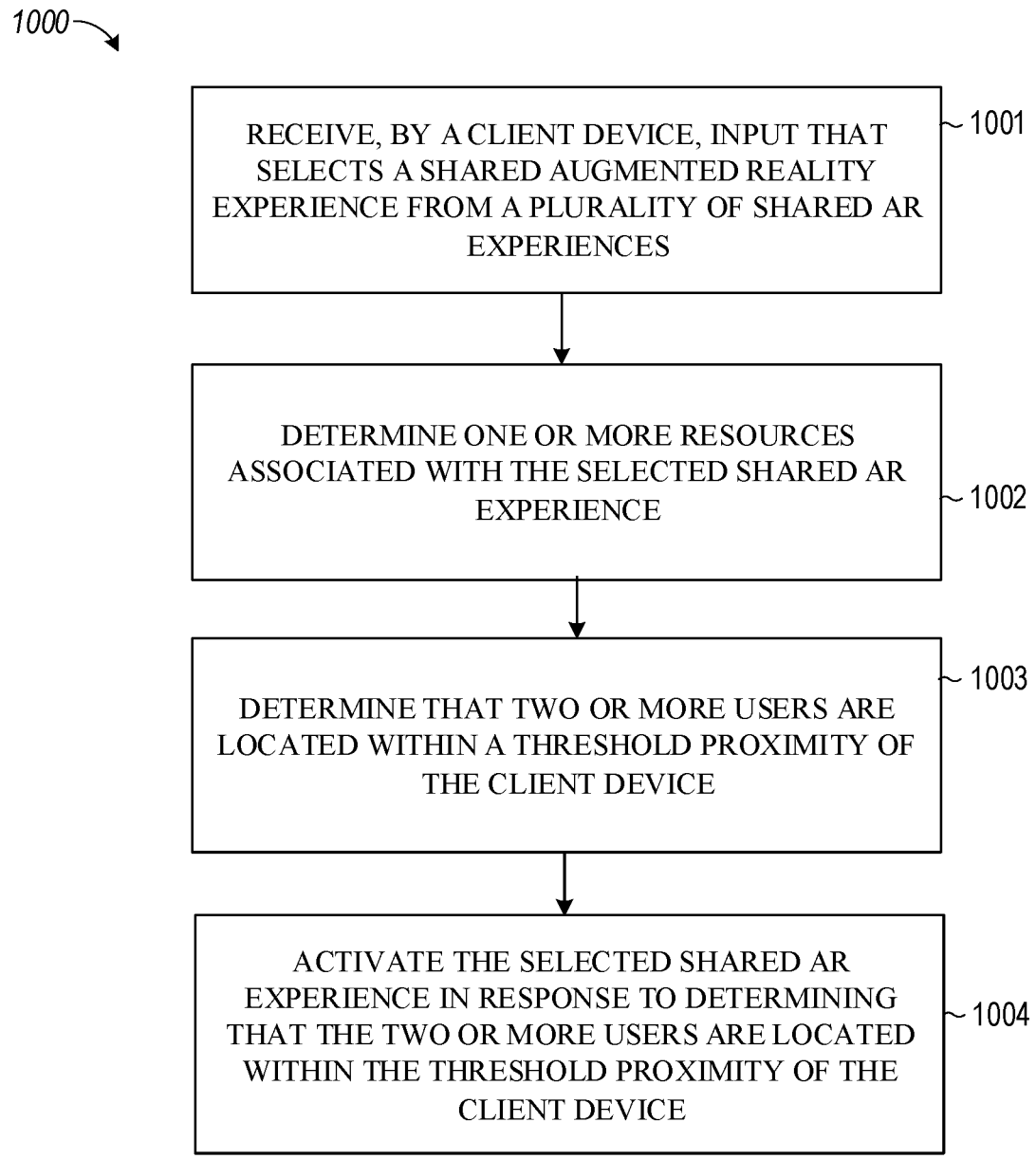
FIG. 10 is a flowchart illustrating example operations of the messaging application server, according to examples.

FIG. 10 is a flowchart of a process 1000 for a shared AR session, in accordance with some example examples. Although the flowcharts can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 receives input that selects a shared augmented reality (AR) experience from a plurality of shared AR experiences. For example, as discussed above, the client device 102 presents a plurality of shared AR experiences and receives input selecting a given one of the shared AR experiences.

At operation 1002, the client device 102 in response to receiving the input, determines one or more resources associated with the selected shared AR experience. For example, the client device 102 activates a rear-facing camera and a pet detection or feet detection process in response to determining that a first shared AR experience was selected. As another example, the client device 102 activates a front-facing camera and a face detection process in response to determining that a second shared AR experience was selected.

At operation 1003, the client device 102 determines that two or more users are located within a threshold proximity of the client device 102. For example, the client device 102 can receive input indicating who the users are in the room along with images of their faces, the client device 102 can determine that two feet are present in a video feed to determine that two or more users are located within the threshold proximity, a same marker or object is captured by cameras of different client devices 102, or the client devices 102 can communicate with another client device 102 using short range communication to determine that the other client device 102 is within the threshold proximity.

At operation 1004, the client device 102 activates the selected shared AR experience in response to determining that the two or more users are located within the threshold proximity of the client device, as discussed above.

Machine Architecture

Figure 11:
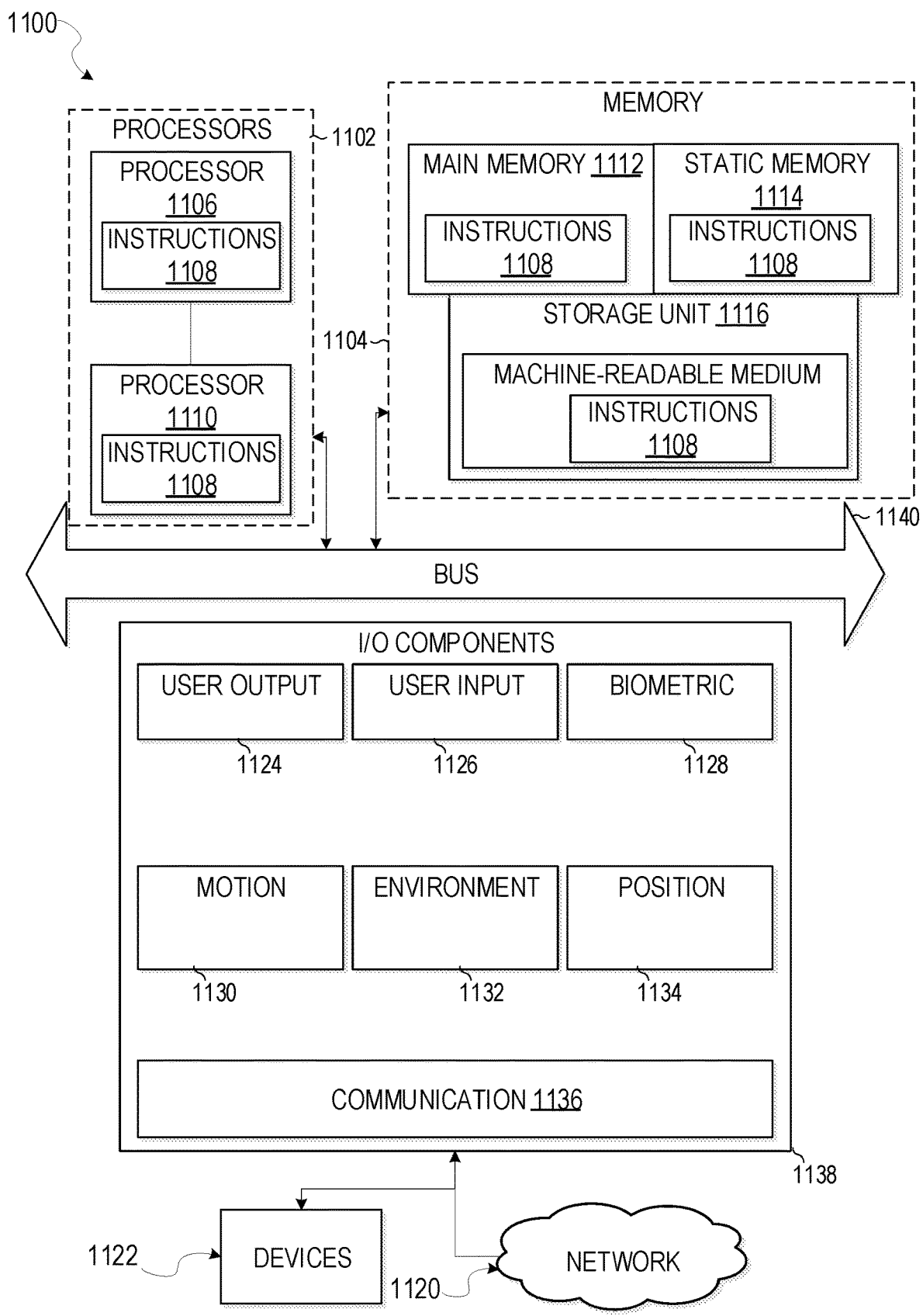
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140 an example, the processors 1102 (e.g., a Central Processing Unit (CPU), a Reduced Instruction Set Computing (RISC) Processor, a Complex Instruction Set Computing (CIBC) Processor, a Graphics Processing Unit (GPU), a Digital Signal Processor (DSP), an Application Specific Integrated Circuit (ASIC), a Radio-Frequency Integrated Circuit (AMC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126, The user Output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components, one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
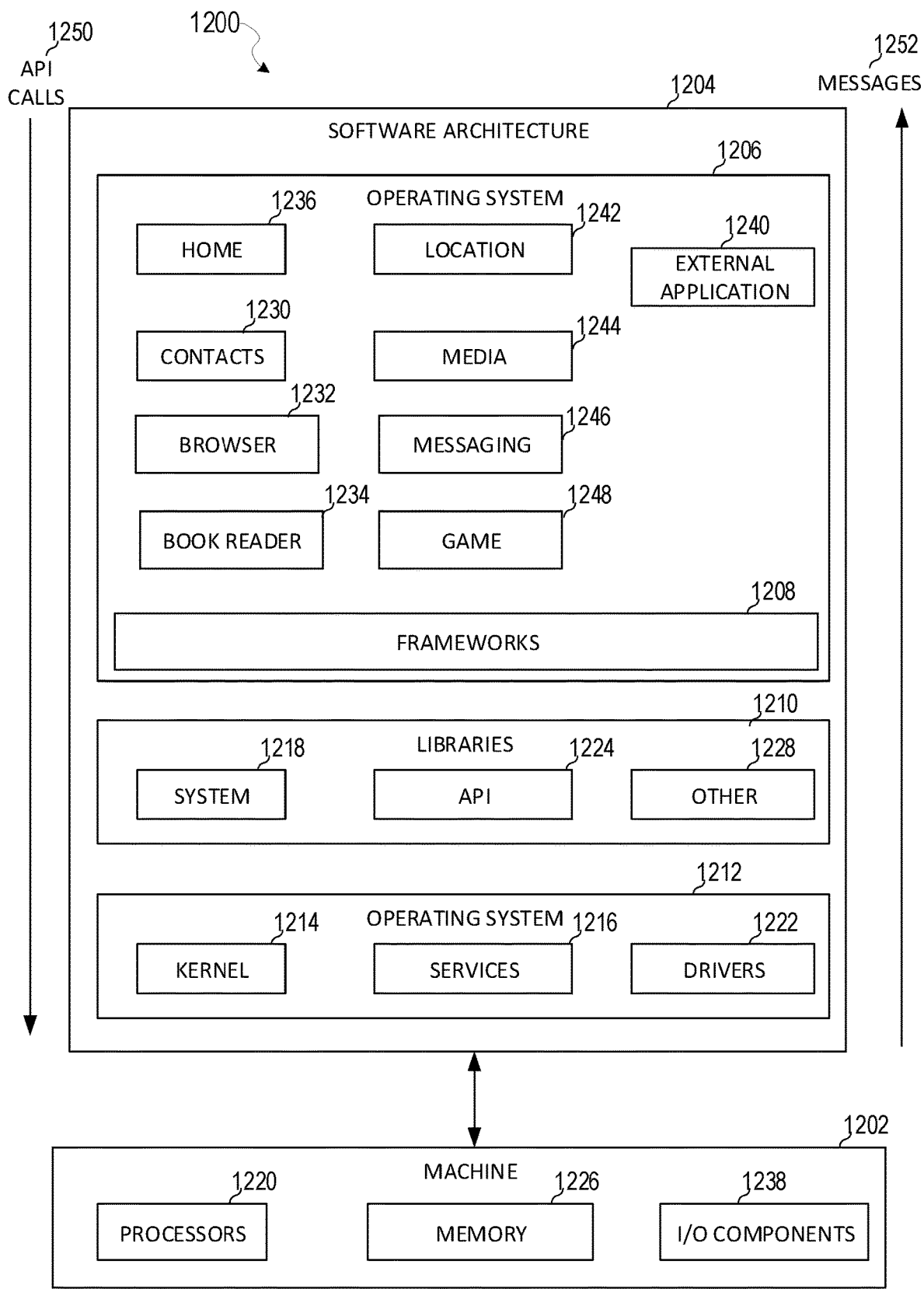
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FIR drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced. Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (MAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    receiving, by a client device, input that selects a shared augmented reality (AR) experience from a plurality of shared AR experiences, each of the plurality of shared AR experiences being configured to be operated independently of a server;
    determining, by the client device, that two or more users are located within a threshold proximity of the client device;
    activating the selected shared AR experience in response to determining that the two or more users are located within the threshold proximity of the client device; and
    in response to activating the selected shared AR experience, displaying, by the client device, a user interface comprising a group timer and a task timer, the group timer representing a collective amount of time available for the two or more users to complete respectively assigned tasks, and the task timer representing an amount of time remaining for a given user of the two or more users to complete the respectively assigned task.

2. The method of claim 1, wherein the selected shared AR experience comprises a shared device AR experience that is accessed one-at-a-time by each of the two or more users on a same shared client device.

3. The method of claim 2, further comprising:
    prompting a first user of the two or more users to interact with the selected shared AR experience on the client device;
    in response to recognizing a face of the first user, presenting the user interface to the first user and starting the task timer and the group timer; and
    after the first user completes a task of the selected shared AR experience, pausing the group timer at a current timer value and instructing the first user to pass the client device to a second user, prompting the second user of the two or more users to interact with the selected shared AR experience on the client device; and
    in response to recognizing a face of the second user, re-starting the task timer and un-pausing the group timer from the current timer value.

4. The method of claim 2, wherein the client device is shared by the two or more users to access the selected shared AR experience, further comprising:
    determining that the group timer or the task timer has expired; and
    in response to determining that the group timer or the task timer has expired, automatically capturing an image of one of the two or more users who is interacting with the client device when the group timer or the task timer expires.

5. The method of claim 4, further comprising sending the automatically captured image to the two or more users.

6. The method of claim 1, wherein the selected shared AR experience comprises a shared device AR experience that is accessed concurrently by each of the two or more users on a same shared client device.

7. The method of claim 1, wherein the selected shared AR experience comprises an AR experience that is shared across a plurality of devices comprising the client device.

8. The method of claim 7, wherein the client device is a first client device, further comprising:
synchronizing the selected shared AR experience between the first client device and a second client device of one of the two or more users;
detecting, by a third client device of a second of the two or more users, a marker in a physical environment of the first and second client devices, the marker representing a value of the group timer; and
in response to both the second and the third client devices detecting the marker, initiating the selected shared AR experience concurrently on the first and second client devices.

9. The method of claim 8, further comprising:
displaying the marker on a screen of the first client device; and
scanning the marker, displayed on the screen of the first client device, by the second and the third client devices.

10. The method of claim 8, further comprising:
initiating the group timer for the selected shared AR experience; and
determining which of the first and second client devices completed a task of the selected shared AR experience before the group timer expires.

11. The method of claim 10, wherein the marker is a first marker and the task is a first task, further comprising:
after the group timer expires, displaying a second marker that represents a second task; and
initiating another timer for completing the second task.

12. The method of claim 8, wherein the marker, used to initiate the selected shared AR experience, is animated to change a size of the marker over time to represent a value of the group timer.

13. The method of claim 1, wherein the selected shared AR experience comprises a storytelling shared AR experience, further comprising:
receiving a video feed from a camera of the client device;
detecting presence of feet of one of the two or more users within the video feed captured by the camera; and
presenting a story on the client device in response to detecting presence of the feet of one of the two or more users within the video feed.

14. The method of claim 13, further comprising:
presenting an augmented reality fish swimming in a body of water;
detecting that a first foot of the feet of the one of the two or more users has been moved in a first direction;
in response to detecting that the first foot has been moved in the first direction, causing the augmented reality fish to descend; and
in response to detecting that the first foot has been moved in a second direction opposite the first direction, causing the augmented reality fish to ascend.

15. The method of claim 13, further comprising:
presenting a first augmented reality puppet on a first foot of the feet of the one of the two or more users to replace a depiction of the first foot in the video feed with a depiction of the first augmented reality puppet;
controlling the first augmented reality puppet based on detecting movement of the first foot of the feet of the one of the two or more users; and
controlling a second augmented reality puppet based on detecting movement of a second foot of the feet of the one of the two or more users.

16. The method of claim 15, further comprising:
detecting contact between the first foot and the second foot indicating tapping of the feet of the one of the two or more users together; and
in response to detecting contact between the first foot and the second foot, presenting an augmented reality effect.

17. The method of claim 1, wherein the selected shared AR experience comprises a pet related AR experience, further comprising:
detecting presence of a real-world pet within a video feed captured by the client device;
displaying a plurality of augmented reality elements on the video feed; and
incrementing a score each time the pet overlaps one of the plurality of augmented reality elements.

18. The method of claim 1, wherein the selected shared AR experience comprises a whole body AR experience, further comprising:
detecting presence of a whole body of a user of the two or more users within a video feed captured by the client device;
receiving input that taps a screen of the client device at a position at which a portion of the whole body of the user is presented;
overlaying a first augmented reality element on the video feed at the position in response to receiving input that taps the screen of the client device; and
ending the AR experience in response to determining that the whole body of the user has been overlaid by augmented reality elements.

19. A system comprising:
a processor; and
a memory component having instructions stored thereon, when executed by the processor, causes the processor to perform operations comprising:
receiving, by a client device, input that selects a shared augmented reality (AR) experience from a plurality of shared AR experiences, each of the plurality of shared AR experiences being configured to be operated independently of a server;
determining, by the client device, that two or more users are located within a threshold proximity of the client device;
activating the selected shared AR experience in response to determining that the two or more users are located within the threshold proximity of the client device; and
in response to activating the selected shared AR experience, displaying, by the client device, a user interface comprising a group timer and a task timer, the group timer representing a collective amount of time available for the two or more users to complete respectively assigned tasks, and the task tinier representing an amount of time remaining for a given user of the two or more users to complete the respectively assigned task.

20. A non-transitory computer-readable storage medium having stored thereon, instructions when executed by a processor, causes the processor to perform operations comprising:
receiving, by a client device, input that selects a shared augmented reality (AR) experience from a plurality of shared AR experiences, each of the plurality of shared AR experiences being configured to be operated independently of a server;

determining, by the client device, that two or more users are located within a threshold proximity of the client device;

activating the selected shared AR experience in response to determining that the two or more users are located within the threshold proximity of the client device; and in response to activating the selected shared AR experience, displaying, by the client device, a user interface comprising a group timer and a task timer, the group timer representing a collective amount of time available for the two or more users to complete respectively assigned tasks, and the task timer representing an amount of time remaining for a given user of the two or more users to complete the respectively assigned task.

* * * * *